May 30, 1944.                    W. L. HAWK ET AL                    2,349,865
                              CONTAINER SEAMING MACHINE
                                Filed Jan. 13, 1942                5 Sheets-Sheet 1
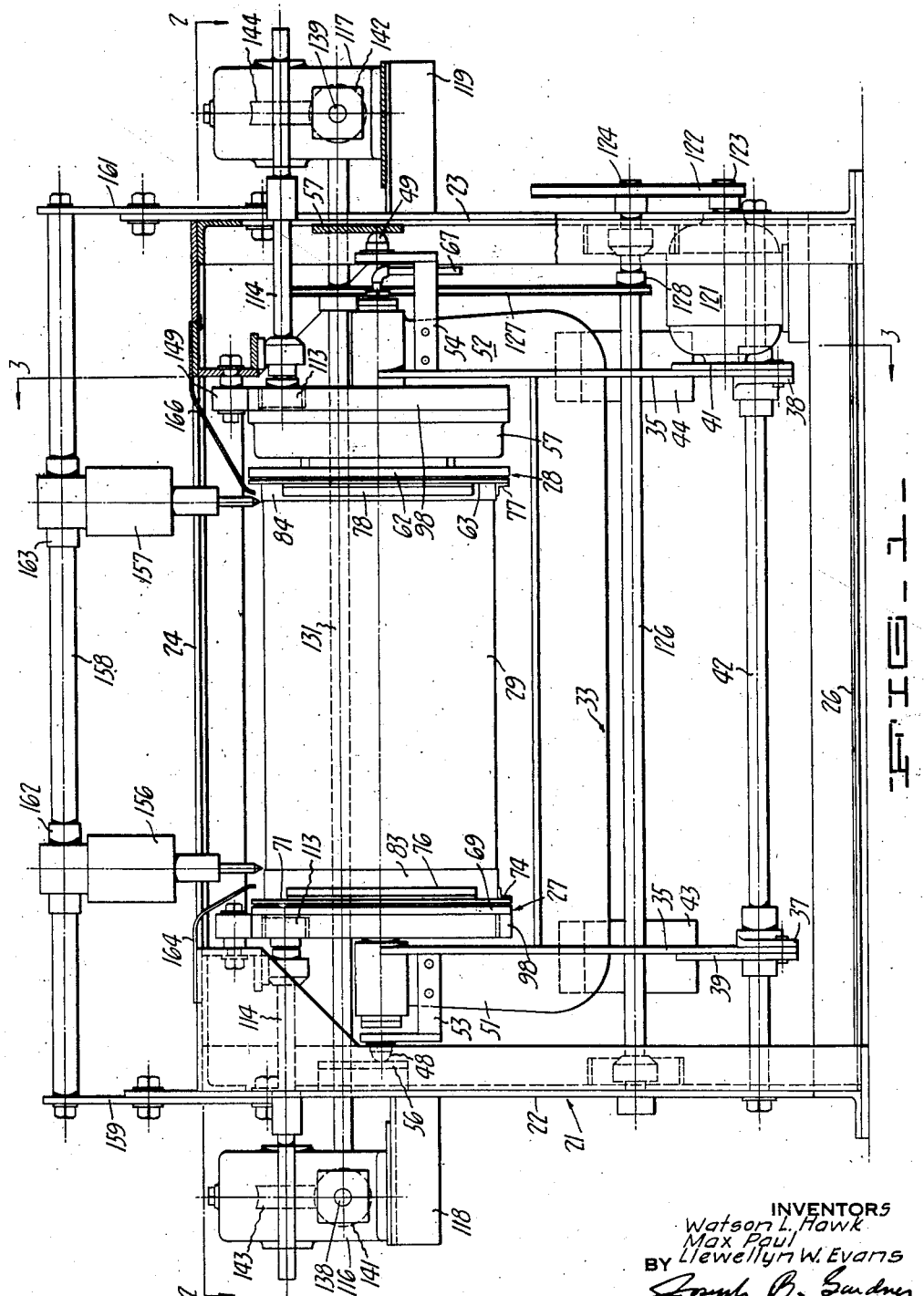
INVENTORS
Watson L. Hawk
Max Paul
Llewellyn W. Evans
BY

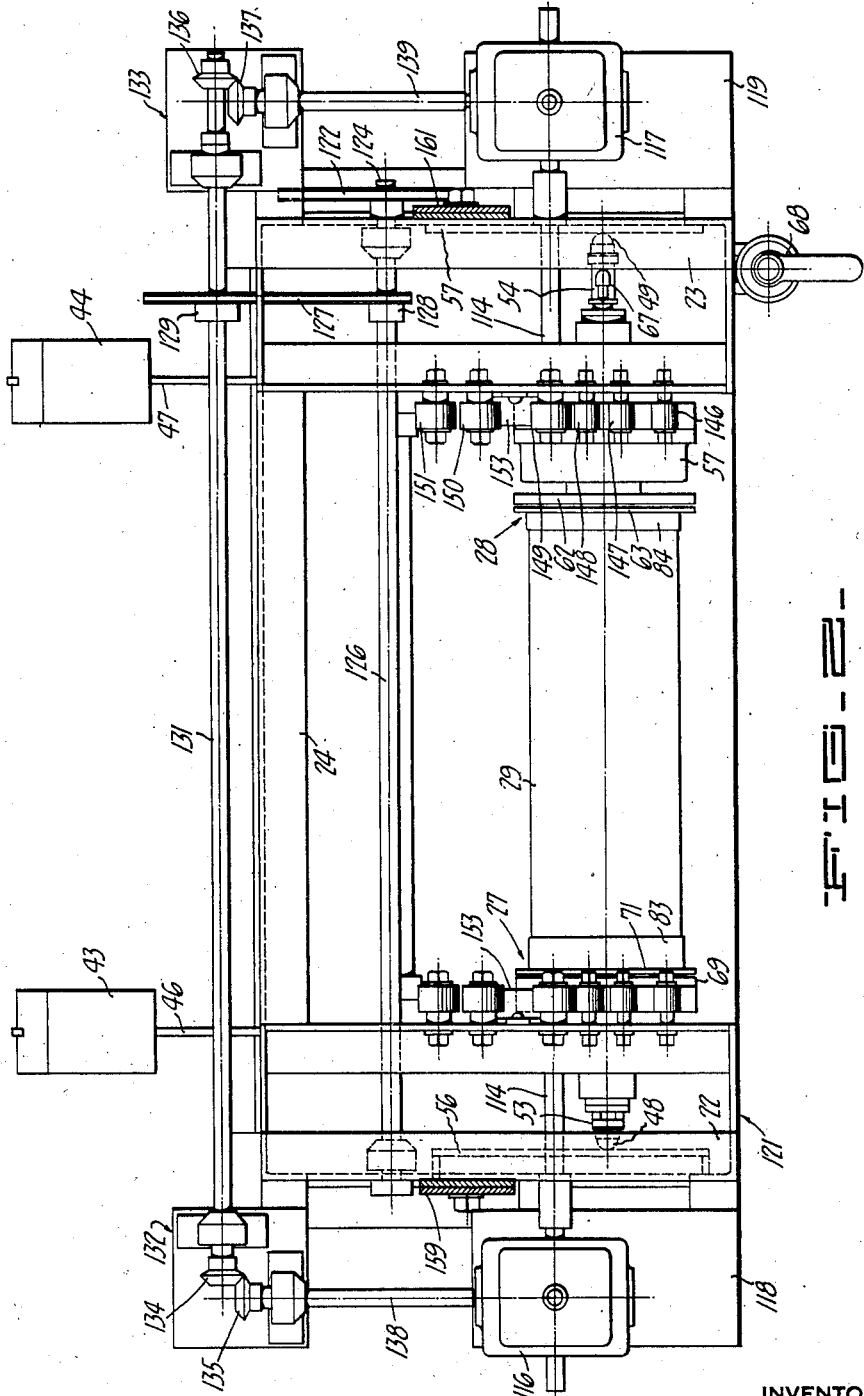

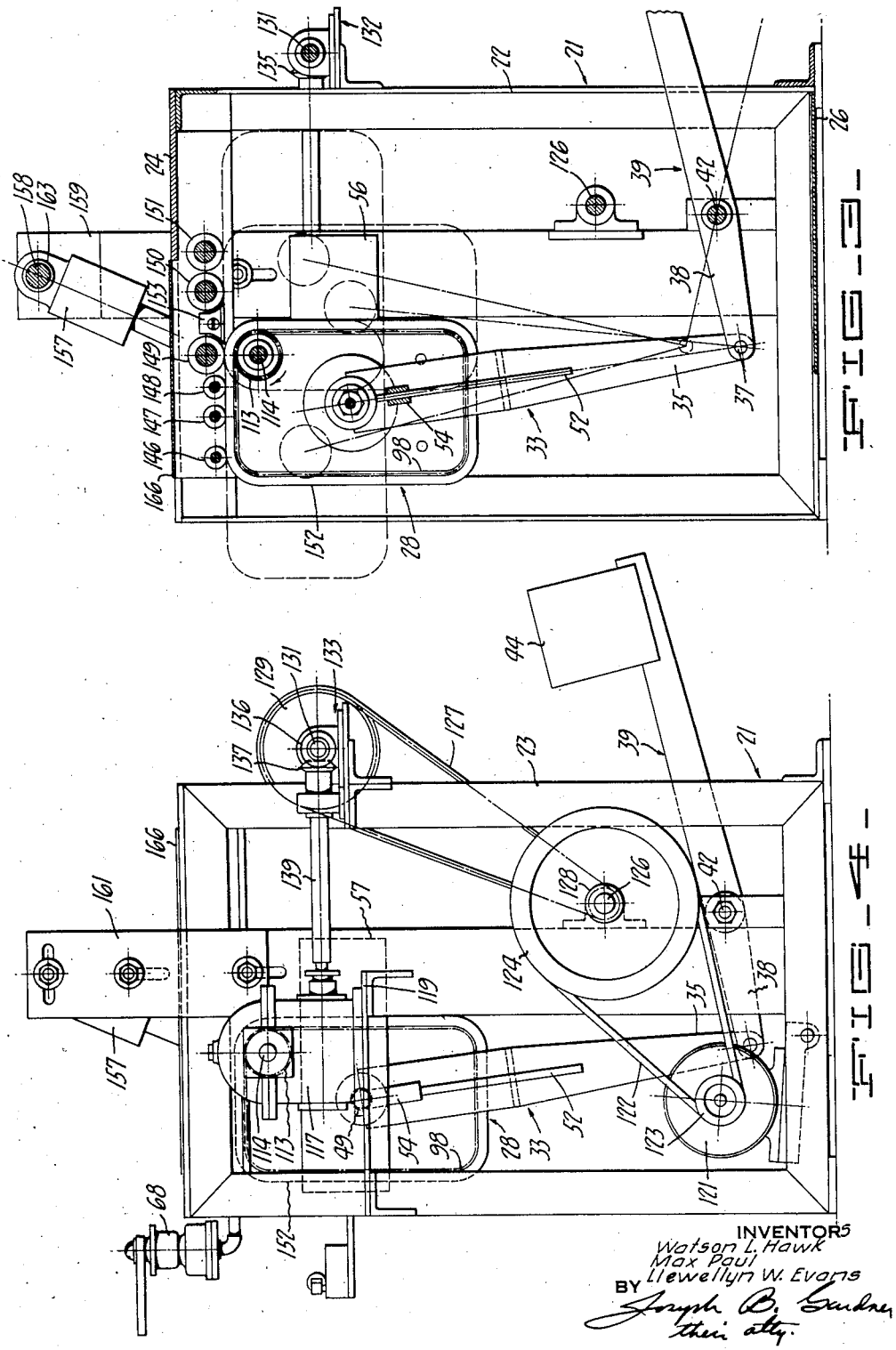

May 30, 1944. W. L. HAWK ET AL 2,349,865
CONTAINER SEAMING MACHINE
Filed Jan. 13, 1942 5 Sheets-Sheet 4
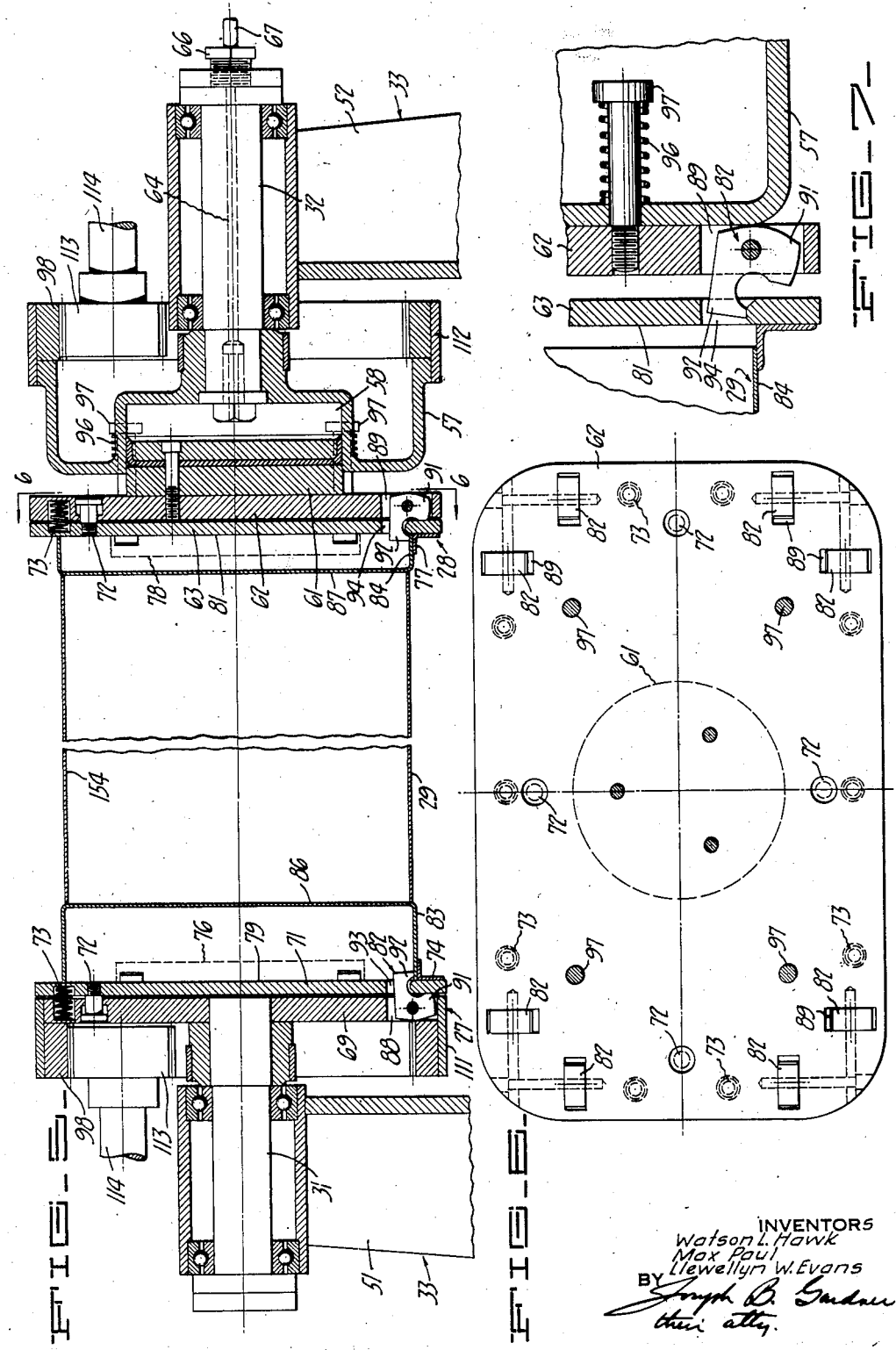
INVENTORS
Watson L. Hawk
Max Paul
Llewellyn W. Evans
BY Joseph B. Gardner
their atty.

May 30, 1944.   W. L. HAWK ET AL   2,349,865
CONTAINER SEAMING MACHINE
Filed Jan. 13, 1942   5 Sheets-Sheet 5
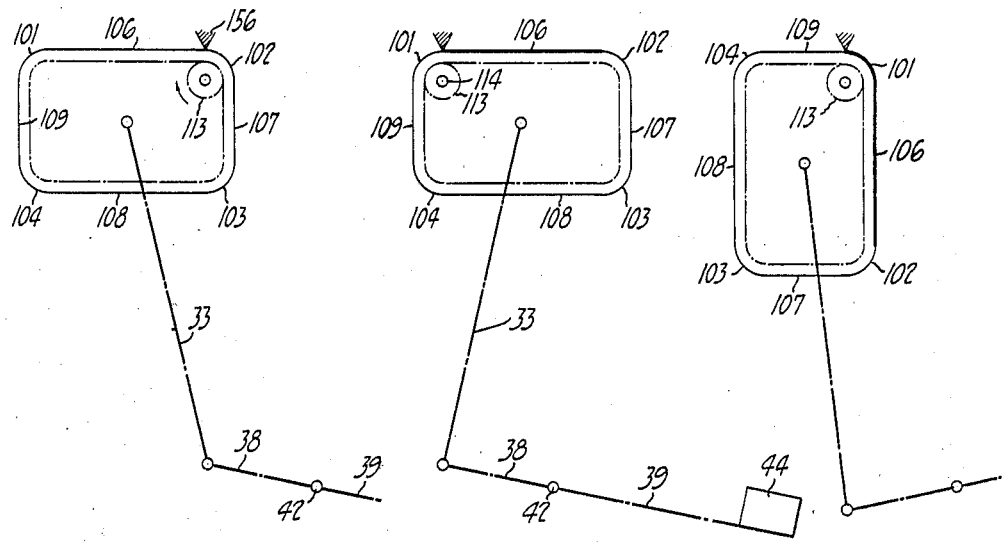
FIG_8_   FIG_9_   FIG_10_
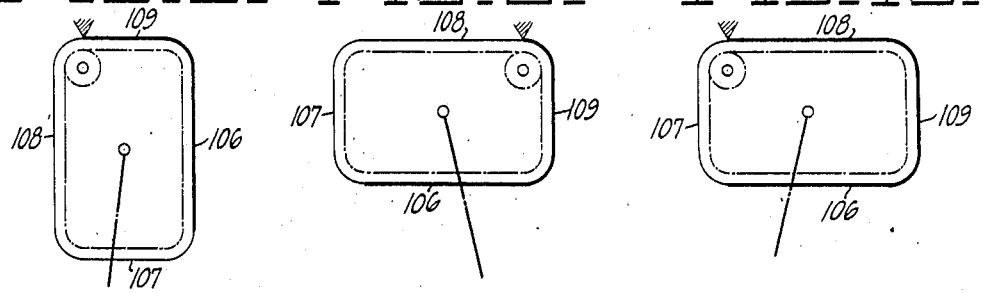
FIG_11_   FIG_12_   FIG_13_
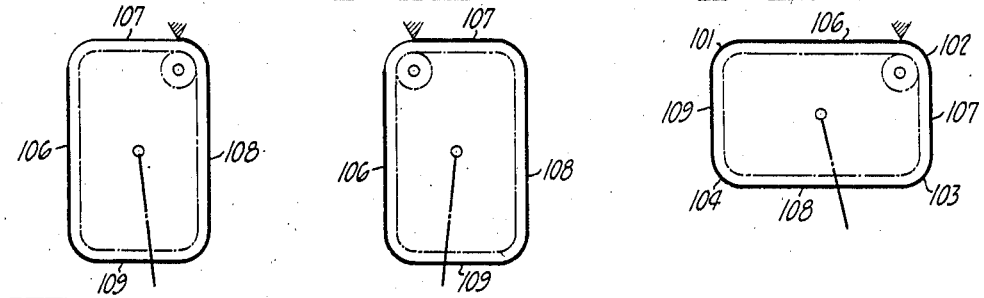
FIG_14_   FIG_15_   FIG_16_
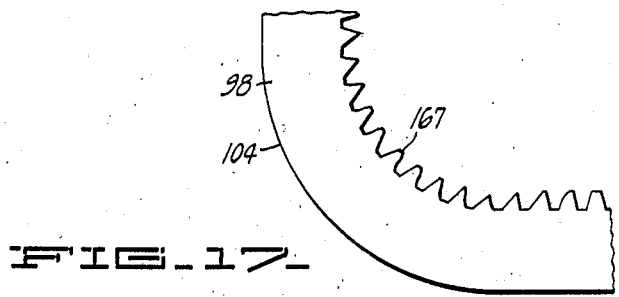
FIG_17_
INVENTORS
Watson L. Hawk
Max Paul
Llewellyn W. Evans
BY
Joseph B. Gardner
their atty.

Patented May 30, 1944

2,349,865

UNITED STATES PATENT OFFICE 2,349,865

CONTAINER SEAMING MACHINE

Watson L. Hawk, Max Paul, and Llewellyn W. Evans, Stockton, Calif., assignors to Rheem Manufacturing Company, Richmond, Calif., a corporation of California Application January 13, 1942, Serial No. 426,608

10 Claims. (Cl. 113—59)

The invention relates to welding machines and more particularly to such machines as may be adapted for seaming the periphery of a container.

An object of the present invention is to provide a welding machine of the character described which is adapted for seaming the periphery of a polygonal container and which is operative to move the entire polygonal periphery of the container past a welding head at a constant lineal speed and spacing with respect to such head.

Another object of the invention is to provide a container seaming machine of the character described having an improved container gripping and centering mechanism which is automatic in its operation to permit an easy and rapid insertion and removal of the container and which will insure a proper positioning of the container in the machine at all times during the seaming process.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a front elevation of a container seaming machine constructed in accordance with the present invention with a part of the supporting frame shown in section.

Figure 2 is a plan sectional view of the machine taken substantially on the plane of line 2—2 of Figure 1.

Figure 3 is a vertical cross sectional view of the machine taken substantially on the plane of line 3—3 of Figure 1.

Figure 4 is an end view of the machine.

Figure 5 is an enlarged fragmentary longitudinal vertical sectional view of the container holding mechanism and attendant structure.

Figure 6 is a cross sectional view taken substantially on the plane of line 6—6 of Figure 5 showing one of the pressure plates in front elevation.

Figure 7 is an enlarged fragmentary vertical sectional view showing one of the fastening detent members and associated structure, also seen in Figure 5.

Figures 8 to 16 inclusive are a series of diagrammatic representations showing the progressive stages of movement of the pinion and ring gear and supporting structure for the latter, forming part of the present machine, in effecting a full peripheral movement of the container to be seamed.

Figure 17 is an enlarged fragmentary side elevation of a part of the ring gear.

The machine as depicted in the accompanying drawings consists briefly of a pair of coaxial opposed rotatable head members which are mounted for universal movement in planes at right angles to their axis of rotation and which are adapted to grip a polygonal container having straight sides and rounded corners in endwise relation therebetween, in combination with an internal ring gear having a polygonal form conforming to the polygonal periphery of the container, and secured to at least one of the head members in coaxial relation thereto, and a drive pinion having a fixed axis of rotation and enmeshed with the ring gear and having a pitch radius equal to the radius of curvature of the rounded corners of the ring gear, whereby the pinion will effect a rectilinear movement of the ring gear and head members when engaged with the straight sides of the ring gear and will effect a rotation of the heads and ring gear about the axis of the pinion when the pinion is engaged with the corners of the ring gear.

The machine is assembled upon a support 21 comprising essentially a cubical frame including end frames 22 and 23 and longitudinally extending top and bottom members 24 and 26. Mounted in opposed coaxial relation within the supporting frame are a pair of head members 27 and 28 which are adapted to grip a polygonal container 29 in endwise coaxial relation therebetween. These head members are provided with axially longitudinally extending shafts 31 and 32 which are journaled for rotation in the upper ends of a yoke frame 33 which is in turn provided with longitudinally spaced depending arms 35 which are pivoted at their lower ends to the ends 37 and 38 of a pair of counterbalancing levers 39 and 41 journaled intermediate their length on a longitudinally extending shaft 42 carried between the end frames 22 and 23. Weights 43 and 44 are positioned at the opposite ends 46 and 47 of the levers so as to urge the upward positioning of the yoke frame 33 and the head members 27 and 28. In this manner the head members are permitted a universal movement, that is vertically and horizontally in planes at right angles to the longitudinal axis of rotation of these head members. Preferably the yoke frame 33 is supported against endwise displacement by means of end abutment members 48 and 49, see Figure 1, secured to the side arms 51 and 52 of the yoke frame in longitudinally spaced relation thereto by means of supporting brackets 53 and 54, and slidably abut end plates 56 and 57 mounted depthwise across the end frames 22 and 23.

In accordance with the present construction and as best seen from Figure 5, means is provided for displacing one of the head members toward the other so as to clamp the ends of the container 29 therebetween. Such means is in the present case adapted to be pneumatically operated and as here embodied in head member 28. As will be seen from Figure 5, this head member includes a casing member 57 held by the yoke frame against longitudinal movement and formed with an axial recess 58 therein defining a pneumatic cylinder opening axially toward the opposite head member 27. A piston 61 is mounted for axial reciprocation in the cylinder 58 and has secured to the forward side thereof a backing plate 62 which in turn supports a relatively movable container end engaging plate 63. Air or other operating fluid is supplied the cylinder 58 from the base end thereof by means of a passage 64 extending axially through the shaft 32 to which the casing member 57 is fixed and which is operatively connected by a fitting 66 to a fluid supply conduit 67 leading to a control valve 68, see Figures 2 and 4, which is connected between a source reservoir (not shown) and the cylinder 58. Thus by opening of the control valve 68, the head member 28 is displaced to the left, as viewed in Figure 5, to thereby effect a clamping of a container 29 placed between the head members.

The opposite head member 27 is constructed similar to the head member 28 but without the pneumatic actuator and is composed of a backing plate 69 fixed for rotation with shaft 31, and a forwardly positioned, endwise displaceable, container engaging plate 71. Stripper bolts 72 connect the two plates 62—63 and 69—71 of the head members 27 and 28 for limiting the separation of the plates and such separation is normally urged by a plurality of springs 73 mounted between the plates. As aforementioned, the present machine has been designed for handling containers of polygonal form, that is one having straight sides and rounded corners when viewed in end elevation or transverse section. An initial support for the container is provided by right angularly arranged guide members 74 and 76, and 77 and 78 mounted on the container engaging faces 79 and 81 of head plates 71 and 63, adapted to provide a base support and depthwise stop for the opposite ends of the containers. In addition to the endwise clamping of the container between the head members, transverse locking means is provided here in the form of a plurality of dogs or detents 82 which are automatically projected from the container engaging faces 79 and 81 of the heads to engage and lock with the endwise extending flanges 83 and 84 bounding the head ends 86 and 87 of the container. These dogs are mounted in openings 88 and 89 in the backing plates 69 and 61 and are pivoted intermediate their lengths to the plates along axes parallel to the plane of the plates and are of bell crank form having one end 91 extending from the pivot in the plane of the plate and adapted for engagement with and displacement by the adjacent plates 71—63, and an opposite end 92 extending at right angles to the plane of the plate and positioned to project through openings 93 and 94 in the adjacent plates 71—63 and to swing outwardly and engage and lock with the container end flange 83—84. Thus upon initially positioning the container on guides 74, 76, 77, 78, and opening the control valve 68, head member 28 moves to the left as illustrated in Figure 5 to clamp the container ends and in so doing compresses the head plates 69—71 and 62—63 together against the resilience of springs 73, which action in turn rocks the dogs 82 through the container engaging plates 71—63 to forcibly engage and lock in place the end flanges of the container. Upon release of the pressure in the fluid cylinder 58 and discharge of compressed fluid therefrom through a discharge port (not shown) in the valve, the head member 28 is retracted to the right, as viewed in Figure 5, by means of compression springs 96, see Figure 7, which are mounted on bolts 97 connecting plate 62 and the casing member 57. This separation of the head members is accompanied by a separation of the plates 69—71 and 62—63, due to action of springs 73, and a retraction of the dog ends 92 into the openings 93—94 and away from the plate faces 79—81, thus permitting sliding out of the container 29 and insertion of a new container. Preferably, and as here shown, the walls of the openings 93—94 are beveled at the dogs 82 and the dogs rounded thereat so as to produce the retractive rocking of the dogs ends 92 into the openings 93—94 upon separation of the plates.

In accordance with the present invention and as a principal feature thereof, means is provided for moving the head members and container clamped therebetween through a polygonal course of movement exactly conforming to the polygonal shape of the container periphery, so as to cause the entire periphery of the container to pass a fixed point, such as a welding head, at a constant velocity and while maintaining a constant spacing with respect to such point. The container for which the present machine has been designed is of rectangular shape in cross section having straight sides and rounded corners, although as will be presently more clearly understood, the machine may be readily adapted for use with any polygonal container or other object having rounded corners. To effect such a movement, we mount on at least one of the head members and preferably on both, and in coaxial relation thereto, an internal ring gear 98 which is formed with a tooth pitch line of a polygonal form exactly conforming to the polygonal form of the container periphery. Thus the pitch radius of the corners 101, 102, 103, 104 of the gear and the length of the straight sides 106, 107, 108, 109 thereof, see Figures 8 to 17, are identical to the radius of curvature and the length, respectively, of the corners and sides of the container periphery. As will be best seen from Figures 1 and 5, we mount one of such ring gears 98 in the head 27 by fastening the gear at the outer side of plate 69, a surrounding band 111 being used around the gear and the periphery of plate 69 to assist in holding the members together. In the opposite head 28, an identical ring gear 98 is fastened to the outer side of the casing member 57, a band 112 similar to band 111 being used around the ring gear and casing member for assembly purposes.

The ring gears and the opposite head members are driven in unison by means of pinions 113 enmeshed with the ring gears and mounted on drive shafts 114 extending longitudinally through the end frames 22 and 23 to gear boxes 116, 117 mounted on supporting platforms 118 and 119 on the end frames 22 and 23. As will be seen from Figures 1 and 5, the pinions 113 are positioned to engage the top portion of the ring gear, and as will be seen from Figures 1 and 2, the pinion shafts 114 are mounted in longitudinal coaxial alignment. In the present construction power for driving the pinions is derived from an electric motor 121 mounted at the base of the support and connected by belt 122 and pulleys 123—124 to a counter-shaft 126 extending lengthwise of the support between the end frames. This latter shaft is in turn connected by belt 127 and pulleys 128 and 129 to a second counter-shaft 131 extending across the back of the machine between the end frames, see Figure 2, the several pulley and belt connections being such as to effect a substantial reduction in speed from the motor 121 to the counter-shaft 131. The opposite ends of shaft 131 are journaled in gear boxes 132 and 133 containing bevel pinions 134—135 and 136—137 for transmitting the drive at right angles to shaft 131 by way of forwardly extending shafts 138 and 139 connecting gear boxes 132 and 133 to gear boxes 116 and 117, see Figure 2. A further reduction in speed is effected in gear boxes 116 and 117 by the use of worms 141 and 142 on shafts 138 and 139 which engage worm gears 143 and 144 on shafts 114. Besides effecting a desirable reduction in speed, the worm gear drive in gear boxes 116—117 affords an even more important function of serving as a unidirectional drive and effectively preventing the ring gears, weighted by the structure connected thereto, from driving the pinions when the ring gears are in an imbalanced position with respect to the pinions. In other words in order to obtain a constant lineal displacement of the ring gears and head, it is necessary that the speed of rotation of the pinions which may be controlled, remain constant and any over-driving of the pinions by the ring gear would interfere with this constant speed of rotation of the ring gear and entire drive mechanism. Thus the worms 141 and 142 operate not only to transmit a constant speed of movement to the worm gears 143 and 144, but in addition prevent such worm gears from transmitting motion to the worms to cause an acceleration when an imbalanced position of the ring gears and head assembly would urge such acceleration.

In accordance with the present construction and as will be best seen from Figure 3, the pitch radius of the pinions 113 is equal to the radius of curvature of the pitch circle in the corners of the ring gear, whereby a positive lock between the pinion and gear corners is effected when these parts are enmeshed. As a result the pinion drive is effective to produce a constant rectilinear movement of the ring gears when engaged with the straight sides 106—109 thereof and to cause a constant annular displacement of the ring gears about the axis of the pinions when the pinions are engaged with the corners 101—104 of the ring gears. In either event since the peripheral speed of the pinion is constant at all times, the peripheral speed of the ring gear is likewise constant.

In order to insure a proper rectilinear movement of the ring gears and heads secured thereto as such movement is imparted to the ring gears by the pinions 113, we provide across the top of the ring gears a straight guide here in the form of a plurality of rollers 146, 147, 148, 149, 150, 151, which engage the outer periphery 152 of the ring gear, or more specifically the outer periphery of the bands 111 and 112 which conform to the periphery of the ring gears. The peripheries of rollers 146—151 are spaced from the pinion 113 by a distance approximately equal to the thickness of the ring gear plus the band 111—112, whereby the ring gear will be confined therebetween, and the rollers are so arranged that the straight line guide provided thereby extends on opposite sides, depthwise, of the pinion 113 whereby a support is afforded the ring gears over approximately the full length of the sides thereof. Preferably and as here shown in Figure 3, one of the intermediate rollers 149 is located directly over the pinion 113. With the pinion rotating in a clockwise direction, with reference to this figure, the ring gear will be displaced rectilinearly to the right until the pinion 113 engages the left hand upper corner of the ring gear, when the latter will be rotated about the axis of the pinion to engage the adjacent side of the ring gear against the roller peripheries. In order to obtain a guide support for the ring gears during rotative movement thereof at the corners, we preferably provide a flat plate guide 153 between rollers 149 and 150 whereby a guide support can be obtained close to the periphery of roller 149 and pinion 113 to support the ring gear during rotative movement. With further reference to Figure 3 and to Figures 8, 9 and 10, it will be noted that the ring gear in its course of movement passes across the vertical center of the lower yoke frame pivot whereby conditions of imbalance are present. This imbalanced condition is counteracted by the combination of the straight guide support provided by rollers 146—151 and the constant upward urge on the yoke frame 33 provided by the counter-balancing levers 39.

In accordance with the foregoing it will be seen that in the operation of the device, the polygonal container or other object carried between the heads, is caused to pass through a polygonal course of movement conforming to the periphery of the device and that with reference to the drive pinions 113, such object is caused to pass a fixed point at a constant lineal speed. In the present construction this operation is taken advantage of for welding the heads 86 and 87 of the container to the side walls 154 of the container, and accordingly we position at the seams joining the heads and side walls and in a longitudinally aligned plane with the pinions 113, a pair of welding heads 156 and 157. The latter are here supported on a longitudinally extending rod 158 which is supported over the head members by end brackets 159—161 depending from the rod 158 and secured to the end frames 22 and 23. Preferably insulation sleeves 162 and 163 slidably mounted on the rod 158 insulate the welding heads from the rod. Flash guards 164 and 166 are desirably mounted across the top of the machine, as illustrated in Figures 1 and 3, in covering relation to the heads 27 and 28 to shield the latter against weld splatter. These flash guards are desirably of sheet metal construction using non-ferrous metal such as copper, brass, bronze or the like, so as to prevent sticking of weld metal thereto.

The complete cycle of operation of the machine is illustrated in Figures 8 to 16 of the drawings. Starting with the representation in Figure 8 and assuming a clockwise direction of rotation of the pinion, it will be seen that the top straight side of the container corresponding to side 106 of the ring gear will be displaced rectilinearly across the welding head 156. To facilitate a description of these views which are more or less diagrammatic, the numbers of the gear sides and corners will be referred to as the equivalent sides of the container. The complete welding across side 106 is indicated with reference to Figure 9, where the ring gear is displaced to the right to bring corner 101 into engagement with the pinion. In the course of this operation the frame 33 indicated as a broken line, passes across the vertical center of its lower pivotal connection to the counter-balancing levers 39, here also diagrammatically indicated. The engagement of the pinion with corner 101 effects a rotation of the ring gear about the axis of the pinion to the position illustrated in Figure 10, where the continuing rotation of the pinion passes side 109 across the point of the welding head. Figure 11 shows the completion of welding along this side 109 and engagement of the pinion with corner 104. Continued rotation of the pinion causes rotation of the ring gear about the pinion axis to the position indicated in Figure 12, where side 108 is brought up for traversing under the welding head. Figure 13 shows the completion of welding along side 108 and engagement of the pinion in corner 103. The subsequent rotation of the ring gear to rotate side 107 up to the welding head is shown in Figure 14 and the traversal of this side and engagement of the pinion with corner 102 is shown in Figure 15. Figure 16 shows the rounding of corner 102 and the completing of the welding cycle. Upon completion of the welding cycle the drive is stopped and valve 68 operated to release the seamed container for removal from the machine, and a new container assembly is positioned in the machine for start of a new operation.

Preferably in order to obtain a proper movement of the pinion teeth into and out of engagement with the corner teeth 167 of the ring gear, see Figure 17, while providing a proper locking engagement therebetween, we prefer to relieve the corner teeth 167 of the ring gear, as shown in Figure 17, to enable proper entry into enmeshed position of the pinion teeth.

We claim:

1. In a machine of the character described for moving a polygonal object having rounded corners past a fixed point at a constant lineal speed, a pair of rotatable head members mounted in axially spaced relation upon a common axis of rotation and being supported for universal displacement in a plane at right angles to said axis, means for moving one of said head members toward the other for gripping said object therebetween, a polygonal internal rack gear mounted on one of said head members in coaxial relation thereto and having straight sides and rounded corners conforming to the peripheral shape of said object, a plurality of rollers having the peripheries theeof in a straight line adapted to engage and support the sides of said gear, a drive pinion enmeshed with said gear and located in alignment with said fixed point and having a pitch radius equal to the radius of curvature of the corners of said gear so as to drive said gear rectilinearly when engaged with the straight sides thereof and to rotate said gear when engaged with the corners thereof, and means connected to said head members for holding the sides of said gear in engagement with said rollers during periods of engagement of said pinion with said sides.

2. In a machine of the character described for moving a polygonal object having rounded corners past a fixed point at a constant lineal speed, a support, a polygonal internal ring gear rotatably carried by said support for universal movement in a plane at right angles to the axis thereof, said gear having straight sides and rounded corners conforming to the peripheral shape of said object, a straight guide carried by said support and positioned for engagement with the straight sides of said ring gear, means for securing said gear and object together in aligned position, a drive pinion enmeshed with said gear and located in alignment with said fixed point and having a pitch radius equal to the radius of curvature of the corners of said gear, and means connected to said gear at approximately the center thereof and yieldably urging said gear toward said guide.

3. In a machine of the character described for moving a polygonal object having rounded corners past a fixed point at a constant lineal speed, a pair of rotatable head members mounted in axially spaced relation upon a common axis of rotation and being supported for universal displacement in a plane at right angles to said axis, means for moving one of said head members toward the other for gripping said object therebetween, a polygonal internal ring gear carried by each of said head members coaxially thereof, said gears having straight sides and rounded corners axially aligned with each other and conforming to the polygonal shape of said object, drive pinions enmeshed with said gears and mounted in axial alignment aligned with said fixed point, said pinions having a pitch radius equal to the radius of curvature of the corners of said gear, means including a plurality of rollers spaced transversely of said point and engageable with said gears and positioned to cooperate with said pinions for guiding the gears in a straight line when moving rectilinearly, and means for driving said pinions in synchronism at a constant rate of speed.

4. In a machine of the character described for moving a polygonal object having rounded corners past a fixed point at a constant lineal speed, a support, a drive pinion carried by said support, a polygonal internal ring gear having straight sides and rounded corners conforming to the peripheral shape of said polygonal object and mounted on said pinion, a straight guide mounted over said pinion and spaced therefrom by approximately the thickness of said ring gear for support of the straight sides of said ring gear thereagainst, said pinion having a pitch radius equal to the radius of curvature of the corners of said ring gear whereby said pinion will displace the sides of said ring gear rectilinearly along said guide when said pinion is enmeshed with said sides and will rotate said gear about the axis of said pinion when said pinion is enmeshed with the corners of said gear, a universal support for said ring gear permitting said rectilinear and rotative movement aforesaid, means for yieldingly urging said ring gear towards said guide, and means for driving said pinion at a constant speed and including a mechanism to prevent over-driving of said pinion by said ring gear.

5. In a machine of the character described for moving a polygonal object having rounded corners past a fixed point at a constant lineal speed, a pair of rotatable head members mounted for coaxial rotation in axially spaced relation, an internal ring gear carried by each of said head members coaxial therewith and having straight sides and rounded corners conforming to the peripheral form of said object, pneumatically actuated means connected to one of said head members for axially reciprocating the same for clamping said object between said head members in coaxial relation thereto for rotation of said object with said head members, and a drive pinion enmeshed with each of said gears and having a pitch radius equal to the radius of curvature of the corners of said gears whereby said pinion will drive said ring gears and head members rectilinearly while engaged with the straight sides of said gears and will rotate said gears and head members about the axes of said pinions when said pinions are engaged with the corners of said ring gears, means to guide said gear in a straight line when moving rectilinearly, and means cooperating with said pinion for holding the side of the gear against said guide means during periods of engagement of said pinion with said sides.

6. In a machine of the character described for moving a polygonal object having rounded corneds past a fixed point at a constant lineal speed, a pair of rotatable head members mounted for coaxial rotation in axially spaced relation, an internal ring gear carried by each of said head members coaxial therewith and having straight sides and rounded corners conforming to the peripheral form of said object, one of said head members being formed with a fluid cylinder extending axially thereof and opening toward the other head member, a piston mounted for reciprocation in said cylinder, a pressure plate carried by said piston and movable therewith for clamping said object between said plate and said other head member for rotation of said object with said head members, and a drive pinion enmeshed with each of said gears and having a pitch radius equal to the radius of curvature of the corners of said gears whereby said pinion will drive said ring gears and head members rectilinearly while engaged with the straight sides of said gears and will rotate said gears and head members about the axes of said pinions when said pinions are engaged with the corners of said ring gears, means to guide said gear in a straight line when moving rectilinearly, and means cooperating with said pinion for holding the side of the gear against said guide means during periods of engagement of said pinions with said sides.

7. In a machine of the character described for moving a polygonal object having rounded corners past a fixed point at a constant lineal speed, a support, a frame mounted for vertical movement on said support and pivoted at its base along a horizontal axis for horizontal and vertical movement of the upper end thereof, head members rotatably carried at the upper end of said frame in spaced relation along a common axis of rotation parallel to said first axis, means for moving one of said head members toward the other to clamp said object therebetween, a ring gear mounted coaxially on at least one of said head members and having straight sides and rounded corners conforming to the peripheral shape of said object, a drive pinion carried by said support and enmeshed with said gear and having a pitch radius equal to the radius of curvature of said gear corners, means to guide said gear in a straight line when moving rectilinearly, and means cooperating with said pinion for holding the side of the gear against said guide means during periods of engagement of said pinion with said sides.

8. In a machine of the character described for moving a polygonal object having rounded corners past a fixed point at a constant lineal speed, a support, a pair of drive pinions carried by said support in spaced relation along a common horizontal axis, an internal ring gear hung upon each of said pinions and having straight sides and mounted corners conforming to the peripheral form of said object, said drive pinions having a pitch radius equal to the radius of curvature of said gear corners, a head member secured to each of said ring gears, means for displacing one of said head members toward the other for clamping said object therebetween in coaxial relation therewith, a horizontal guide carried by said support and spaced over said pinion by a distance approximately equal to the thickness of said ring gear and adapted to engage the outer periphery of said ring gear, a yoke member journaled at its upper end to said head members along a common horizontal axis approximately centrally of said ring gears, a lever pivoted intermediate its ends to said support adjacent the base thereof and pivoted adjacent one end to the lower end of said yoke member, and a weight mounted on the opposite end of said lever for constantly urging the upward displacement of said yoke and head members to maintain engagement of the outer peripheral sides of said ring gears with said guides.

9. In a machine of the character described for moving a polygonal object having rounded corners past a fixed point at a constant lineal speed, a support, a pair of drive pinions carried by said support in spaced relation along a common horizontal axis, an internal ring gear hung upon each of said pinions and having straight sides and rounded corners conforming to the peripheral form of said object, said drive pinions having a pitch radius equal to the radius of curvature of said gear corners, a head member secured to each of said ring gears, means for displacing one of said head members toward the other for clamping said object therebetween in coaxial relation therewith, a horizontal guide carried by said support and spaced over said pinion by a distance approximately equal to the thickness of said ring gear and adapted to engage the outer periphery of said ring gear, a yoke member journaled at its upper end to said head members along a common horizontal axis approximately centrally of said ring gears, a lever pivoted intermediate its ends to said support adjacent the base thereof and pivoted adjacent one end to the lower end of said yoke member, a weight mounted on the opposite end of said lever for constantly urging the upward displacement of said yoke and head members to maintain engagement of the outer peripheral sides of said ring gears with said guides, and a drive mechanism for each of said pinions including a worm reduction gear to prevent overdriving of said pinions by said ring gears when the latter are in an out of balance position with respect thereto.

10. A welding machine for seaming the periphery of a container having a polygonal periphery in transverse section, comprising, a support, a pair of rotatable head members mounted on said support for coaxial rotation in axially spaced relation, means for supporting each of said head members for universal movement in a plane at right angles to the axis of rotation thereof, means moving one of said head members toward the other to grip said container in endwise relation therebetween, an internal ring gear secured to each of said head members in coaxial relation therewith and having straight sides and rounded corners conforming to the peripheral shape of said container, a drive pinion carried by said support and enmeshed with each of said ring gears and mounted in coaxial relation with each other and having a pitch radius equal to the radius of curvature of said gear corners whereby said pinions will drive said head members and said ring gears rectilinearly when said pinions are engaged with the straight sides of said ring gears and will rotate said head members and ring gears around the axes of said pinions when said pinions are engaged with said gear corners, means to guide the ring gear in a straight line when moved rectilinearly, a welding head carried by said support in alignment with said pinions and in an operative relation to the periphery of said container, and flash guards carried by said support in covering relation to said head members.

WATSON L. HAWK.
MAX PAUL.
LLEWELLYN W. EVANS.